W. WHEELER.
FILTER.
APPLICATION FILED JUNE 26, 1913.

1,151,313.  Patented Aug. 24, 1915.

Witnesses:
Horace A. Crouman
Carl L. Choate

Inventor:
William Wheeler.
by Emery, Booth, Janney & Varney
Attys

UNITED STATES PATENT OFFICE.

WILLIAM WHEELER, OF CONCORD, MASSACHUSETTS.

FILTER.

1,151,313.   Specification of Letters Patent.   Patented Aug. 24, 1915.

Application filed June 26, 1913. Serial No. 775,862.

*To all whom it may concern:*

Be it known that I, WILLIAM WHEELER, a citizen of the United States, and resident of Concord, Massachusetts, have invented an Improvement in Filters, of which the following description, in connection with the accompanying drawings, is a specification, like characters on the drawings representing like parts.

This invention relates to filters, and among other objects provides a simple and effective bottom for the filter bed.

Figure 1:
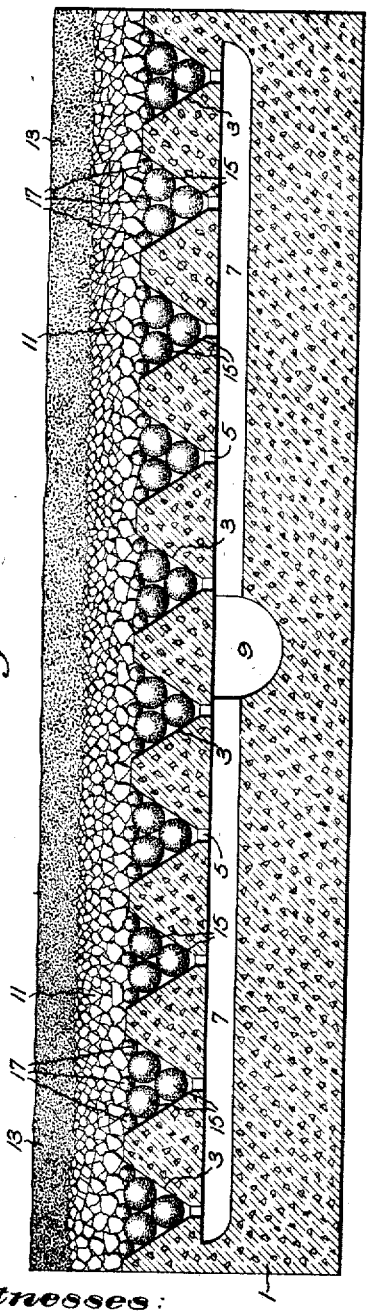
Figure 2:
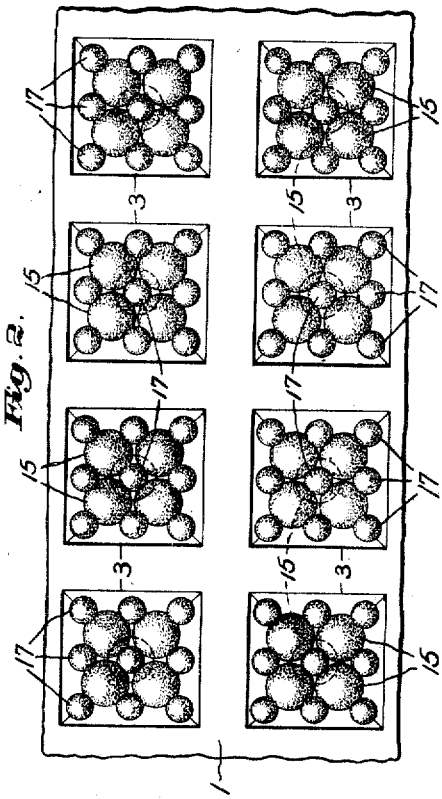

The character of the invention may be best understood by reference to the following description of an illustrative embodiment thereof shown in the accompanying drawing, wherein:

Figure 1 is a vertical section through a portion of an illustrative filter embodying the invention; and Fig. 2 on an enlarged scale is a plan of the filter bed bottom.

Referring to the drawing, the illustrative filter shown therein as embodying the invention comprises a filter bottom 1 of cement or other suitable material formed to present cells or depressions 3 preferably pyramidal in shape and conveniently arranged in rows. Each depression terminates at its apex in an outlet or opening 5. The outlets of each row communicate with a conduit or channel 7 beneath and common thereto and the channels of the several rows in turn communicate with a main conduit or channel 9. These channels are preferably formed in the cement foundation beneath the filter bed 1. Above the filter bottom is a filter bed of sand or other suitable material 13 which may rest on and be supported by a layer 11 of graded gravel or other suitable material. The liquid to be filtered is introduced on top of the filter bed and percolates or passes down through the same to and through the gravel layer and thence passes out through the depressions and their outlets to the channels beneath the same.

It is necessary from time to time in filters of this type to wash out the filtration bed to free the same from impurities. This is done by forcing water back through the channels, up through the outlets, the depressions, and on up through the filtration bed. The water in rising up through the bed carries with it impurities which rise to the top of the water above the filtration bed and are there removed.

By this invention there is provided a construction which among other things effectively distributes the washing water to the filtration material. To this end each depression is provided with an assembly of liquid distributing elements shown here in the form of true spheres 15 made of cement or other suitable material. The number, form and size of these elements may be varied, but it is found in practice that an assembly of five large spheres is very effective. One of these spheres is placed at the apex of the pyramidal depression and four others rest partly on the apex sphere and partly on the walls of the depression. To prevent the working of gravel into the spaces between the four top spheres and between said spheres and the walls of the depression, smaller spheres 17 of glazed pottery, cement or other suitable material may be placed on said top spheres. This arrangement of spheres in the depressions effectively supports the gravel and prevents the latter from working down into and choking the depression and at the same time renders substantially the entire top of the depression available to collect and discharge the filtered water. The depressions provided with the spheres described are very advantageous in distributing the washing water up to the bed. The water on entering the depression strikes the apex sphere and is deflected thereby partly diagonally outwardly to the walls and corners of the pyramidal depression and partly up and around said apex sphere to and around the four upper spheres. The water is further deflected and distributed by the four upper spheres and the smaller spheres at the top of the depression. The spheres are formed with very smooth surfaces so that they present very little friction to the water and enable the latter to readily slip past them. A considerable portion of the water is deflected diagonally to the walls and corners of the depression and tends to follow along said walls by adhesion rather than spatter back toward the center of the depression. The water also tends by adhesion to follow around and embrace the contours of the spheres and thereby tends to hold them in their proper relation.

The spheres are preferably substantially larger than the gravel elements and therefore heavier than the latter. It is a well known fact that a solid sphere is the geometrical form having the greatest weight in proportion to its surface. Therefore, it presents a form which has the greatest weight with least surface friction. The form and surface of the spheres, therefore, render them more resistant or less liable to disturbance or upward propulsion by the upward flowing stream of wash water through the depression. The cumulative effect of the weight of the large spheres or the weight of the filtration material on them substantially maintains them in predetermined relation with ample permanent spaces between them so that they are always properly positioned to uniformly distribute the upward current to the filtration material. The spheres will remain in the depression beneath and in positions effectively to support the gravel layer without any liability of the gravel working down into the depression to clog and choke the same.

As stated, the spheres in the depression as described are very effective for distributing the washing water upward to the filtration bed. The assembly of depressions, therefore, collectively operate to distribute the washing water uniformly throughout the entire area of the filter bed. Preferably the depressions are spaced somewhat so that the water forced up and deflected outward from one will not objectionably combine with a stream of water from another to displace the filtration material. The washing water is distributed by the spherical element containing depressions first to the gravel layer and thence to the sand layer above the same. The water will rise in a sheet up through the filtration bed and float the impurities therefrom, but without objectionably disturbing the sand and gravel of the filter.

While the pyramidal depressions are shown herein as having flat sides it will be understood that pyramidal is used in its broad generic sense and includes conical forms. While the pyramidal form is found to be desirable, it will be understood that tapered wedge shaped and other forms of depressions might be used.

It is not only advantageous to space the depressions in the distribution of the water, but also the spacing of the depressions leaves substantial material between them and permits a thin bottom to be employed, with resultant economy. The layer of graded gravel may rest directly on and be supported by the spheres and therefore the necessity for a screen above the spheres for supporting the filtration material is eliminated.

By my invention is provided a filter bed bottom which is extremely simple and cheap in construction and effectively prevents gravel or sand from clogging the bottom outlets and also serves to distribute the washing water to the filter bed in a very advantageous manner.

Having described one embodiment of the invention, without limiting the same thereto, what I claim as new and desire to secure by Letters Patent is:

1. In a filter, the combination of a bottom having a pyramidal cell and an outlet opening therein, and an assembly of pyramidally arranged spheres over said opening with the apex sphere located and maintained at and over said opening, said spheres having provision for maintaining them in fixed relation, said opening being formed to permit the passage of water past said apex sphere.

2. In a filter the combination of a bottom provided with a series of cells each in the form of an inverted pyramid with an opening at its lower end, a heavy apex sphere in each cell substantially larger than and held fixed over said opening, the latter having provision permitting the flow of water past said sphere, and a layer of similar spheres in each cell above said apex sphere.

3. In a filter the combination of a bottom provided with a series of pyramidal cells each having an opening therein and a water-distributing sphere located over and substantially larger than said opening and held against walls of said cell, said opening and cell having provision permitting the passage of water through said opening past said sphere.

4. In a filter the combination of a bottom provided with a series of tapering cells each having an opening through the lower end thereof and a water-distributing element substantially larger than said opening seated against walls of said cell, the walls of said cell being of dissimilar contour to the seating surface of said element, thereby compelling the passage of water outside of and past said element, and means for holding said element against said walls.

5. In a filter the combination of a bottom provided with a series of tapering cells, each having an opening through the apex end thereof and a relatively large water-distributing element supported and held fixed on the side walls of the cell over said opening for directly receiving the impact of an upward stream of water through said opening and distributing the same upward through the cell, said element being shaped to compel the passage of water between its outer surface and the walls of the cell.

6. In a filter the combination of a bottom provided with a series of openings therein and an assembly of large, relatively fixed, water-distributing spheres located over each opening and arranged in the form of an inverted pyramid, the lowermost sphere of each assembly of spheres being larger than the opening over which it is positioned.

7. In a filter the combination of a bottom having a series of openings therein and an assembly of large, water-distributing elements located over each opening and arranged in the form of an inverted pyramid with the apex element over said opening, the lowermost element of each assembly of elements being sufficiently large to overlie at least the major portion of the opening over which it is positioned, and means for maintaining said elements relatively fixed whereby to distribute an upward stream of water uniformly to filtration material above the bottom.

8. In a filter the combination of a tapering cell with a free and unobstructed opening through the lower end thereof, a water-distributing sphere located over said opening and supported by and resting against side walls of the cell, and a plurality of spheres above and resting partially on said sphere and partially against the walls of said cell, and means for maintaining said spheres in said positions, said spheres being sufficiently large to provide ample passages between one another and the walls of said cell for effecting a uniform predetermined upward distribution of washing water to filtration material above the bottom.

9. In a filter the combination of a bottom provided with a series of cells, each with an opening at its lower end, a water-distributing sphere located over said opening and resting against walls of said cell, a layer of similar spheres located over said sphere, and a layer of smaller spheres located over said first named layer, said cell and spheres forming passages for distributing streams of water to filtration material above them.

10. In a filter the combination of a bottom provided with a series of cells, each having an opening therein and a water-distributing sphere held stationary over said opening, said opening having provision permitting the flow of water therethrough and said sphere, and a plurality of spheres held partially on said sphere and the walls of said cell for further distributing the upward flowing water.

11. In a filter the combination of a bottom provided with a pyramidal cell having an opening through the apex end thereof, a relatively large apex sphere located over said opening, and four similar spheres, each resting partially on said apex sphere and partially on the walls of said cell, said spheres having ample passages between them and the walls of said cell and between one another for distributing washing water uniformly upward to filter material.

12. In a filter the combination of a concrete bottom formed with a series of tapering cells therein having openings at their lower ends, a sphere located and held over each opening, and a layer of spheres held on said first named sphere and walls of said cell, said opening and cell having provision permitting the distribution of washing water up past said spheres.

13. In a filter, the combination of a bottom provided with a series of tapering cells each having an opening through the lower end thereof and a series of relatively fixed water distributing elements positioned over each opening, to distribute the water upward, one at least of said elements being individually of sufficient weight to remain fixed during said upward distribution of the water.

14. In a filter, the combination of a bottom provided with a tapering cell having an opening through the lower end thereof, and a relatively fixed water distributing element positioned over said opening and of sufficient size to overlie at least the major portion of the opening, thereby to distribute the water upward, and maintained substantially undisturbed by the upward flow of water past it.

15. In a filter, the combination of a bottom provided with a tapering cell having an opening through the lower end thereof, and a relatively fixed water distributing element having a curved periphery positioned over said opening and of sufficient size to overlie at least the major portion of the opening, thereby to distribute the water upward, and maintained substantially undisturbed by the upward flow of water past it.

16. In a filter, the combination of a bottom provided with a cell having an opening through the lower end thereof, and a set of water distributing elements positioned over said opening, and maintained relatively fixed through their own weight against the upward flow of water past them.

17. In a filter, the combination of a bottom provided with a cell having an opening through the lower end thereof, a series of water distributing elements positioned over said opening, and filtration material resting directly on said distributing elements, said elements being separately maintained substantially fixed against the upward flow of water past them, thereby permitting said filtration material to rest directly on said elements without disturbance during the upward flow of water.

18. In a filter, the combination of a bottom provided with a cell having an opening through the lower end thereof, a relatively fixed water distributing element positioned over said opening and overlying at least the major portion thereof and so related thereto that the water flows outside of and around said element and filtration material resting directly on said distributing element, the latter being maintained relatively fixed against the upward flow of water past it independently of said filtration material, thereby permitting said material to rest directly on said element without disturbance during the upward flow of water.

19. In a filter, the combination of a bottom provided with a number of tapering cells each having an opening through the lower end thereof, a series of water distributing elements positioned over each opening and independently and separately maintained substantially undisturbed by the upward flow of water past them, and filtration material resting directly on said distributing elements.

20. In a filter, a bottom provided with a plurality of openings, a bed of filtration material above said bottom, and means between said material and said openings to effect a uniform, upward distribution of water through said bed, said means including an element for each opening of sufficient size to overlie at least the major portion of such openings and so related thereto that the water flows outside of and around said elements.

21. In a filter, a bottom provided with a plurality of openings, a bed of filtration material above the bottom, and means consisting of a relatively small number of elements between said openings and bed to effect the subdivision of the upward streams entering through said openings, into a plurality of smaller streams and the uniform presentation of said smaller streams past said elements to the bed of filtration material, the element nearest each opening overlying at least the major portion thereof and so related thereto that the water flows outside of and around said element.

22. In a filter, a bottom provided with a series of closely adjacent cells, distributed over the entire bottom, and each having an opening at the lower end thereof, a bed of filtration material above the bottom, and means positioned in said cells and consisting of a relatively small number of large elements to effect the subdivision of the upward streams entering through said openings, into a plurality of smaller streams and the uniform presentation of said smaller streams to the bed of filtration material, the lowermost element in each cell being of sufficient size to overlie at least the major portion of the opening thereof, and so related thereto that the water flows outside of and around the same.

23. In a filter, the combination of a bottom provided with a cell having an opening through the lower end thereof and a set of water distributing elements positioned over said opening, each of said elements being individually and separately maintained substantially fixed against the upward flow of water past them.

24. In a filter, the combination of a bottom provided with a tapering cell having an opening through the lower part thereof, and an assembly of water distributing elements small in number and symmetrically arranged in said cell to permit the upward passage of water past said elements, the latter being substantially fixed against said upward passage of water, the lowermost element in said cell being of sufficient size to overlie at least the major portion of the opening thereof and so related thereto that the water flows outside of and around the same.

25. In a filter, the combination of a bottom provided with a tapering cell having an opening through the lower end thereof and as assembly of water distributing elements, small in number, and each having a predetermined position in said cell above said opening and each maintained in its position substantially unmoved by said upward passage of water, the lowermost element in said cell being of sufficient size to overlie at least the major portion of the opening thereof and so related thereto that the water flows outside of and around the same.

26. In a filter, the combination of a bottom having an opening therethrough, and a series of relatively fixed water distributing elements positioned over said opening, the lowermost of said elements being of sufficient size to overlie at least the major portion of said opening and so related thereto that the water flows outside of and around said element, and the other members of said series each being of a size at least approximating that of said lowermost element.

27. In a filter, the combination of a bottom having an opening therethrough, and a series of relatively fixed water distributing elements positioned over said opening, the lowermost of said elements being of sufficient size to overlie at least the major portion of said opening and so related thereto that the water flows outside of and around said element, and the other members of said series each being of a size at least approximating that of said lowermost element, and filtration material resting directly on said distributing elements.

28. In a filter, the combination of a bottom provided with an opening, and a series of relatively fixed water distributing elements positioned over said opening, to distribute the water upward, one at least of said elements being individually of sufficient weight to remain substantially fixed during the upward distribution of the water.

29. In a filter, the combination of a bottom, provided with an opening, and a relatively fixed water distributing element positioned over said opening and of sufficient size to overlie the major portion of the opening, thereby to distribute the water upward, and remain substantially undisturbed by the upward flow of water past it.

In testimony whereof, I have signed my name to this specification, in the presence of two subscribing witnesses.

WILLIAM WHEELER.

Witnesses:
  HENRY T. WILLIAMS,
  LOUIS A. JONES.

It is hereby certified that in Letters Patent No. 1,151,313, granted August 24, 1915, upon the application of William Wheeler, of Concord, Massachusetts, for an improvement in "Filters," an error appears in the printed specification requiring correction as follows: Page 4, line 91, claim 25, for the word "as" read *an;* and that the said Letters Patent should be read with this correction therein that the same may conform to the record of the case in the Patent Office.

Signed and sealed this 21st day of September, A. D., 1915.

[SEAL.]

J. T. NEWTON,

*Acting Commissioner of Patents.*